United States Patent
Schuppan et al.

(10) Patent No.: US 12,034,903 B1
(45) Date of Patent: Jul. 9, 2024

(54) OBJECT COLOR MANAGEMENT USING RASTER IMAGE PROCESSORS AND OBJECT DETECTION AND SEMANTIC SEGMENTATION

(71) Applicant: Fiery, LLC, Fremont, CA (US)

(72) Inventors: Holger Schuppan, Bottrop (DE); Haresh Joshi, Foster City, CA (US)

(73) Assignee: FIERY, LLC, Fremont, CA (US)

( * ) Notice: Subject to any disclaimer, the term of this patent is extended or adjusted under 35 U.S.C. 154(b) by 0 days.

(21) Appl. No.: 18/496,202

(22) Filed: Oct. 27, 2023

(51) Int. Cl.
| | |
|---|---|
| *H04N 1/60* | (2006.01) |
| *G06T 7/10* | (2017.01) |
| *G06T 7/90* | (2017.01) |
| *G06T 19/20* | (2011.01) |
| *G06V 10/764* | (2022.01) |
| *G06V 10/774* | (2022.01) |
| *G06V 10/82* | (2022.01) |
| *G06V 20/70* | (2022.01) |
| *H04N 1/00* | (2006.01) |
| *H04N 1/54* | (2006.01) |

(52) U.S. Cl.
CPC ............. *H04N 1/6069* (2013.01); *G06T 7/10* (2017.01); *G06T 7/90* (2017.01); *G06V 10/764* (2022.01); *G06V 10/774* (2022.01); *G06V 10/82* (2022.01); *G06V 20/70* (2022.01); *H04N 1/00336* (2013.01); *H04N 1/54* (2013.01); *H04N 1/6072* (2013.01); *G06T 2207/10024* (2013.01); *G06T 2207/20081* (2013.01); *G06T 2207/20084* (2013.01)

(58) Field of Classification Search
CPC .... H04N 1/6069; H04N 1/00336; H04N 1/54; H04N 1/6072; G06T 7/10; G06T 7/93; G06T 2207/10024; G06T 2207/20081; G06T 2207/20084; G06V 20/70; G06V 10/82; G06V 10/774; G06V 10/764
See application file for complete search history.

(56) References Cited

U.S. PATENT DOCUMENTS 9,066,054 B2 * 6/2015 Mestha ................ H04N 1/6072
2022/0348003 A1 * 11/2022 Daher ......................... G06T 7/12

* cited by examiner

*Primary Examiner* — Quang N Vo
(74) *Attorney, Agent, or Firm* — Perkins Coie LLP

(57) ABSTRACT

A raster image processor and a convolutional neural network or other artificial intelligence module operate in parallel. Image data for printing is passed to the raster image processor and the convolutional neural network. The raster image processor translates computer vector files and/or rasterizes bitmaps having higher or lower resolution than the output device to a raster image that includes a matrix of dots a printer can process. The raster image processor generates layers for process inks. The convolutional neural network generates a mask layer, based on the image, that is used by the raster image processor to generate an additional layer for spot colors, object colors, or specialty ink. The mask layer transmitted to the raster image processor generates a spot color layer. The layers generated by the raster image processor and the additional layer for the spot colors and/or specialty inks are combined into a print data file.

20 Claims, 8 Drawing Sheets

OBJECT COLOR MANAGEMENT USING RASTER IMAGE PROCESSORS AND OBJECT DETECTION AND SEMANTIC SEGMENTATION

FIELD OF THE INVENTION

This description relates generally to object color management using raster image processors and object detection and semantic segmentation.

BACKGROUND

Printing technology enables production of high-quality, detailed images, and is widely known for versatility in handling a wide range of media, such as paper, cardstock, glossy photo paper, fabric, etc. Printing technology is compatible with different types of inks (e.g., dye-based inks, pigment-based inks, solvent-based inks) including water-based inks. However, traditional printing methods typically require manual work by a designer and/or an artist to define spot colors or specialty ink usage. In conventional systems, such manual work is performed by a human using design software to create a print file, such as a PDF™ file, to be loaded into printing software. While traditional printing software can detect and distinguish between object types in print files, such as text, graphics and/or images, conventional systems typically cannot analyze the content of such object types and images in particular. Moreover, traditional methods for printing typically use a two-step process including image recognition to identify persons in an image followed by color post-processing, which is inefficient for large data sets and leads to greater electricity usage and/or increased data storage requirements.

SUMMARY

This specification describes methods, systems and apparatuses for object color management using raster image processors and object detection and semantic segmentation. In some embodiments, a computer system includes a raster image processor and a convolutional neural network or other artificial intelligence operating in parallel. Image data for printing is passed to the raster image processor and the convolutional neural network. The image data can include text, images of people, images of animals, and/or objects. The raster image processor translates (rasterizes) computer vector files (such as InDesign™, Illustrator™, Photoshop™, PDF™, or JPG™), provided in a high-level page description language such as PostScript™, PDF™, or XPS™. In some implementations, the raster image processor rasterizes bitmaps of higher or lower resolution than the output device. The output data file can be resized using an image scaling algorithm. The input data files are rasterized to a raster image (sometimes referred to as a bitmap) that includes a matrix of dots that a printer can process.

The raster image processor generates layers for process inks, such as cyan, magenta, yellow, and black. The convolutional neural network generates a mask layer, based on the image, that is used by the raster image processor to generate an additional layer for spot colors, object colors, or specialty ink. The mask layer is transmitted to the raster image processor to generate a spot color layer. The layers for process inks and the additional layer for spot colors, object colors, or specialty ink are combined into a print data file for printing by a printer or printing system. If the printing mechanism does not have a required spot color ink available, then the spot color layer is used as an intermediate layer, which is later mapped to a pre-defined combination of the available process colors, replacing the process color combination that was originally determined for the area of the image corresponding to the object of interest.

In some implementations, image processing is performed as a subfunction of the raster image processor operation. The raster image processor hands the image or a portion of a document having text and images to the convolutional neural network for processing, receives a mask layer in return, and continues with generating layers for process inks. A deep neural network or a convolutional neural network is used for classification of objects in images for generating print data to improve the print quality and/or create certain effects on a printout. The deep neural network is a class of object detection and semantic segmentation algorithms that mimics information processing of the brain. Generation of an additional mask layer is performed for selecting spot colors and/or specialty inks (such as matte, varnish, fluorescent, or "glow in the dark" ink), or modifying color treatment either within or outside a detected object.

In some embodiments, a pre-flight module is implemented to process an image before the image is processed by a raster image processor. The pre-flight module can include an object detection and/or semantic segmentation step to generate a mask layer, based on the image, that is used by the raster image processor to generate an additional layer for spot colors, object colors, or specialty ink. The mask layer is transmitted to the raster image processor to generate a spot color layer. In some examples, the processed image and print data are used to generate a high-quality and/or high-definition digital image for use online or in a video instead of being used for printing.

In some embodiments, a post-processing filtering module performs color management after the raster image processor and convolutional neural network stages. For example, a computer system includes at least one computer processor and a non-transitory, computer-readable storage medium storing a software filter that when executed by the at least one computer processor, causes the at least one computer processor to receive an image for performing object color management on an object having at least one color in the image. A convolutional network can be used for performing object detection and/or semantic segmentation.

These and other aspects, features, and implementations can be expressed as methods, apparatus, systems, components, program products, means or steps for performing a function, and in other ways. These and other aspects, features, and implementations will become apparent from the following descriptions, including the claims.

DETAILED DESCRIPTION

Figure 1:
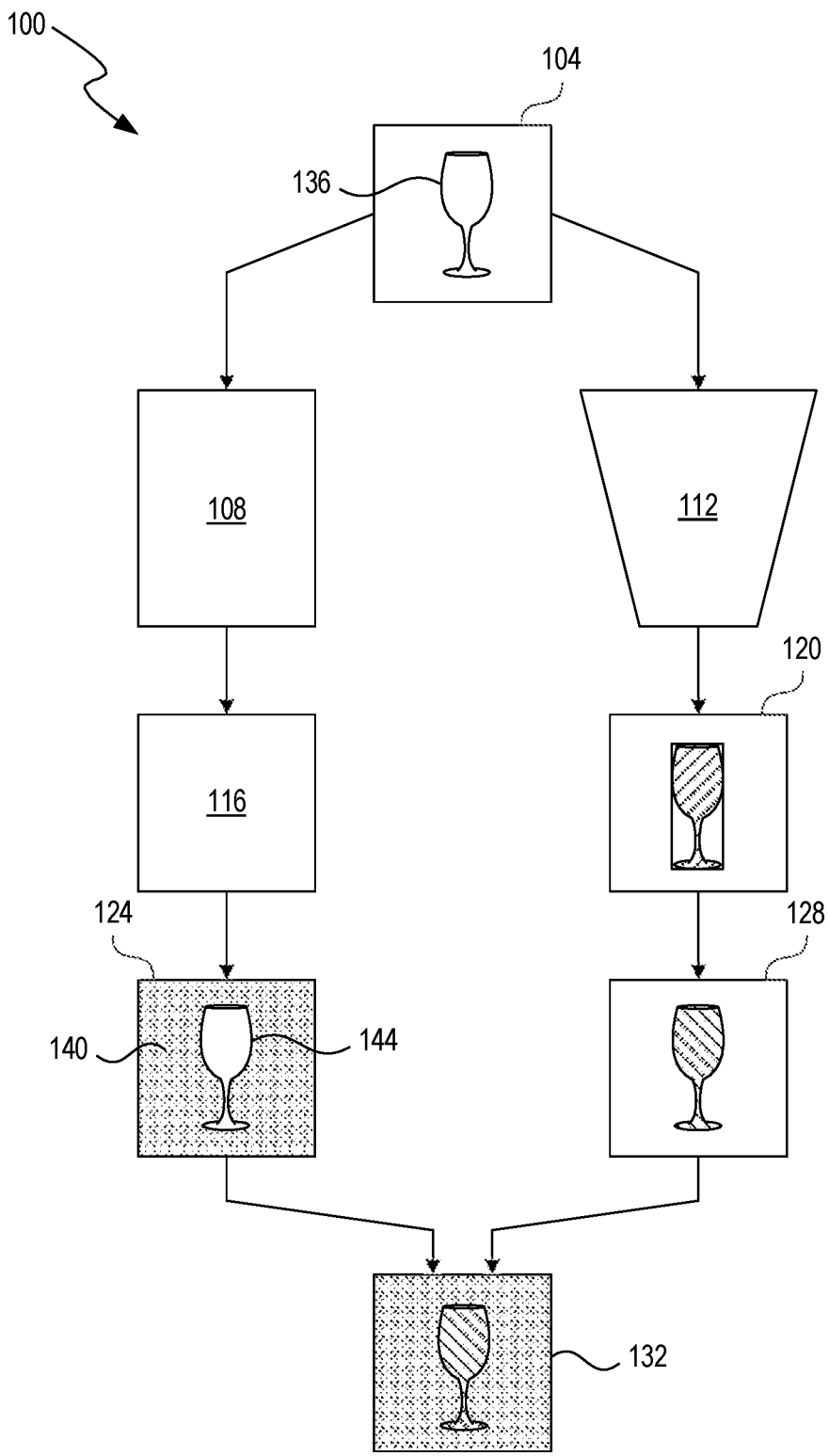
FIG. 1 is a drawing illustrating a process for object color management using raster image processors and object detection and semantic segmentation, in accordance with one or more embodiments.

In the following description, for the purposes of explanation, numerous specific details are set forth in order to provide a thorough understanding of the present embodiments. It will be apparent, however, that the present embodiments may be practiced without these specific details.

This document presents methods, apparatuses and systems for object color management using raster image processors and object detection and semantic segmentation. In some aspects, a computer-implemented method is used for object color management using a raster image processor and an object detection and semantic segmentation module. A computer system receives an image for depositing ink onto a substrate to print the image on the substrate. The image represents at least one object. Semantic segmentation is performed using the object detection and semantic segmentation module on the image to extract the at least one object from the image. The object detection and semantic segmentation module is trained to perform the semantic segmentation using multiple training images. The object detection and semantic segmentation module generates (1) at least one mask layer corresponding to the at least one object and (2) at least one spot color for the at least one object based on the multiple training images.

The raster image processor generates (3) at least one process ink layer based on the image and (4) at least one spot color layer based on the at least one mask layer. The at least one process ink layer is associated with at least one color of the ink. The at least one spot color layer is associated with the at least one spot color. The raster image processor generates print data based on the at least one process ink layer and the at least one spot color layer. The print data describes a modified version of the image. A portion of the modified version of the image represents the at least one object comprises the at least one spot color. The print data is sent to a printing system for printing the modified version of the image on the substrate.

In some embodiments, a printing system includes at least one computer processor configured to execute instructions. The instructions cause the printing system to receive, by a raster image processor, text and an image for printing on a substrate. The image comprises at least one object. An object detection and semantic segmentation module performs semantic segmentation on the image to extract the at least one object from the image. The object detection and semantic segmentation module produces at least one spot color for the at least one object. The raster image processor provides (1) at least one process ink layer based on the text and a portion of the image lacking the at least one object, and (2) at least one spot color layer based on the at least one spot color. The raster image processor generates print data based on the at least one process ink layer and the at least one spot color layer. A printing mechanism is communicatively coupled to the at least one computer processor and configured to print the text and the image on the substrate using the print data.

In some aspects, a non-transitory computer readable medium stores computer instructions that when executed by one or more computer processors, cause the one or more computer processors to receive, by a pre-flight module, an image for printing on a substrate. The image comprises at least one object. The pre-flight module provides at least one spot color corresponding to the at least one object by performing semantic segmentation, using an object detection and semantic segmentation module, on the image to extract the at least one object from the image. A raster image processor generates at least one process ink layer based on the image. The raster image processor generates first print data based on the at least one process ink layer and second print data based on the at least one spot color. The first print data and the second print data is sent to a printing mechanism for printing the image on the substrate.

In some aspects, a computer system includes at least one computer processor and a non-transitory, computer-readable storage medium storing a software filter. When executed by the at least one computer processor, the software filter causes the at least one computer processor to receive an image for performing object color management on an object having at least one color in the image. An object detection and semantic segmentation module segments the image to extract the object from the image. The object detection and semantic segmentation module segments the object into a first part and a second part. The object detection and semantic segmentation module provides a first part color for the first part and a second part color for the second part based on multiple training images. The software filter replaces the at least one color of the object in the image with the first part color and the second part color. The image comprising the object having the first part color and the second part color is displayed on an electronic display of the computer system.

The advantages and benefits of the disclosed methods, systems, and apparatuses for object color management using raster image processors and object detection and semantic segmentation include detection of objects within image data that require special treatment (such as spot coloring or specialty inks). Brand logos can be detected within photographs and print data for the logos is implemented using the spot color definition for the brand unlike in conventional systems that typically require manual work by a designer and/or an artist to define spot colors or specialty ink usage. The disclosed implementations provide improved image quality for special effects printing as well as for digital images and videos (such as those used in extended-reality (XR) applications).

Instead of applying ink across an entire page or requiring a designer to mask out images of people or other objects in an image manually as in conventional printing methods, the disclosed systems generate mask layers automatically for spot coloring or specialty inks, such as to address color management for images of traffic signs, traffic lights, or skin tones. Moreover, the advantages of the convolutional neural network used for object detection and semantic segmentation in some disclosed embodiments include the obviation of feature extraction and the use of shared weight in convolutional layers, which means that the same filter (weights bank) is used for each node in the layer; this both reduces memory footprint and improves performance.

FIG. 1 is a diagram 100 illustrating a process for object color management using raster image processors and object detection and semantic segmentation, in accordance with one or more embodiments. In some implementations, the process is performed by printing system 600 illustrated and described in more detail with reference to FIG. 6. In some implementations, the process is performed by a computer system, e.g., the example computer system 800 illustrated and described in more detail with reference to FIG. 8. Particular entities, for example, object detection and semantic segmentation system 500 (illustrated and described in more detail with reference to FIG. 5) perform some or all of the steps of the process in other implementations. Likewise, implementations can include different and/or additional steps or can perform the steps in different orders.

A computer-implemented method is used to perform object color management using a raster image processor 116 and an object detection and semantic segmentation module 112. The disclosed embodiments detect object in images that require special treatment (e.g., spot colors or specialty inks). The embodiments can be performed by raster image processor 116 while creating print data. For example, brand logos on photographs are detected; the logos are printed using the spot color definitions of the brand. The raster image processor 116 translates (rasterizes) computer vector files (such as InDesign™, Illustrator™, Photoshop™, PDF™, or JPG™), provided in a high-level page description language such as PostScript™, PDF™, or XPS™. In some implementations, the raster image processor rasterizes bitmaps of higher or lower resolution than the output device. The output data file can be resized using an image scaling algorithm. The input data files are rasterized to a raster image (sometimes referred to as a bitmap) that includes a matrix of dots that a printer can process.

In some embodiments, pre-flight module 108 is used, which is described in more detail with reference to FIG. 3. Color management for objects refers to the controlled conversion between the color representations of objects in images manipulated or created by various devices, such as image scanners, digital cameras, monitors, TV screens, film printers, computer printers, offset presses, and corresponding media. Raster image processor 116 is a component used in a printing system which, in some embodiments, produces a raster image also known as print data 132 or a bitmap. The print data 132 or bitmap is used by a later stage of the printing system to produce the printed output. In some implementations, a vector image is used instead of a bitmap. The raster image processor 116 can be implemented in software such as using computer instructions, hardware, firmware, or a combination thereof.

Object detection and semantic segmentation module 112 is similar to or the same as object detection and semantic segmentation system 500 (illustrated and described in more detail with reference to FIG. 5). Object detection and semantic segmentation module 112 can be implemented in software such as using computer instructions, hardware, firmware, or a combination thereof. Object detection and semantic segmentation module 112 can be a classification network capable of image classification to tag objects on an image with a classification result, e.g. "car," "airplane," "dog," "tree," "jewelry," "person," or "face." Optionally this network is also able to perform a semantic segmentation of the classified objects.

In some examples, the object detection and semantic segmentation module 112 comprises a deep neural network or a convolutional neural network. A deep neural network is a multi-layered artificial neural network. Each level of the deep neural network learns to transform its input data into a slightly more abstract and composite representation. For example, for object segmentation, the raw input may be a matrix of pixels; the first representational layer may abstract the pixels and encode edges; the second layer may compose and encode arrangements of edges; the third layer may encode a nose and eyes; and the fourth layer may recognize that the image contains a face. The deep learning process can learn which features to optimally place in which level on its own. Convolutional neural networks are described in more detail with reference to FIG. 5.

In some implementations, a computer system receives image 104 for depositing ink onto a substrate to print the image 104 on the substrate. Image 104 can be a digital image composed of picture elements, also known as pixels, or an analog image composed of two-dimensional analog signals. Example printing systems and printing processes are illustrated and described in more detail with reference to FIGS. 6 and 7. The image 104 comprises at least one object 136 having one or more colors in the image. The object detection and semantic segmentation module 112 performs semantic segmentation on the image 104 to extract the at least one object 136 from the image 104. The object detection and semantic segmentation module 112 is trained to perform the semantic segmentation using multiple training images as illustrated and described in more detail with reference to FIG. 5.

The semantic segmentation is a deep learning process of partitioning a digital image into multiple image segments, also known as image regions or image objects (e.g., object 136. The semantic segmentation associates a label or category with every pixel in image 104. A collection of pixels that form distinct categories is recognized as shown by segmented image 120. The object detection and semantic segmentation module 112 generates (1) at least one mask layer 128 corresponding to the at least one object 136 and (2) at least one spot color for the at least one object 136 based on multiple training images. The object detection and semantic segmentation module 112 processes the image 104 to detect the object 136 within, and determines at least one spot color that should be used for coloring the object 136 when printing.

The at least one mask layer 128 can include information describing the at least one spot color. The at least one mask layer 128 can be used to create shapes, cutouts, gradients, patterns, or effects on the image 104. There are two types of masks in Illustrator and Photoshop: clipping masks and layer masks. Clipping masks use the shape of one layer to clip the contents of another layer, creating a new layer that only shows the area where they overlap. For example, the at least one mask layer 128 uses a grayscale image to hide or reveal parts of a layer, creating a new layer that shows different levels of transparency depending on the mask's brightness. In some embodiments, the raster image processor 116 masks a portion 144 of the image or the at least one process ink layer 124 based on the mask layer 128 prior to generating the print data 132. The wherein the portion 144 of the image is associated with the at least one object 136.

The spot color is a pre-determined color of ink applied directly to the object 136, e.g., an official color of a brand or logo. The at least one spot color can be associated with a brand, a celebrity, a logo, a company, a country, an organization, a university, a flag, or a government, etc. Process colors, on the other hand, include four or more standard ink colors (e.g., cyan, magenta, yellow and black) and sometimes others, such as orange, green, or violet to create many thousands of colors and shades. A spot color is usually used when a few exact colors are needed. The at least one spot color can be associated with a specialty ink. The specialty ink is used by the printing system to create a unique affect, such as suede, reflective, puff, metallic, or glow. The unique effects can include applications such as heat transfer vinyl. The specialty ink can be a suede ink, a reflective ink, a varnish, a white ink, a puff ink, a metallic ink, or a glow ink.

The raster image processor 116 generates print data for a certain printing device and is capable of using the classification results tagged to objects for selecting spot colors (e.g., "Home Depot™ Orange"), addressing special inks on the printing device (e.g., silver metallic ink for "jewelry"), or applying image manipulation operations inside and outside these objects. In some embodiments, the raster image processor 116 generates (3) at least one process ink layer 124 based on the image 104 and (4) at least one spot color layer based on the at least one mask layer 128 and the at least one spot color. The at least one process ink layer 124 is associated with at least one (process) color of the ink used for printing. In some examples, the at least one color of the ink comprises cyan, yellow, magenta, black, orange, green, or other process colors. The process ink layers 124 and spot color layers are in a raster graphics image file format and are capable of storing two-dimensional digital images in various color depths, and optionally with data compression, alpha channels, and color profiles.

The raster image processor 116 generates print data 132 based on the at least one process ink layer 124 and the at least one spot color layer. In some embodiments, the at least one spot color layer is the same as the at least one mask layer 128. The computer system sends the print data to a printing system for printing the image on the substrate. The printing system can be driven by the raster image processor 116 to print the selected spot colors or special inks in addition to the regular set of process colors.

In some implementations, a specialty ink corresponding to the at least one spot color is loaded on the printing system. The image is printed on the substrate using the specialty ink. In other implementations, the computer system retrieves a defined combination of process ink colors corresponding to the at least one spot color from a spot color table. The image is printed on the substrate using the combination of process ink colors. For example, if the printing mechanism does not have a required spot color ink available, then the spot color layer is used as an intermediate layer, which is later mapped to a pre-defined combination of the available process colors, replacing the process color combination that was originally determined for the area of the image corresponding to the object of interest. Values for an ink or combination of inks corresponding to the spot color are defined in a look-up table dictionary (sometimes referred to as a "spot color table"). The spot color table includes pre-defined values for inks in certain color spaces, e.g., CMYK or L*a*b*. The letters L*, a* and b* represent each of the three values the CIELAB color space uses to measure objective color and calculate color differences. L* represents lightness from black to white on a scale of zero to 100, while a* and b* represent chromaticity with no specific numeric limits.

The computer system looks up the spot color in the spot color table, and uses the pre-defined ink values corresponding to the spot color to replace the color values in the input image 104. For example, if mask layer 128 is generated for a spot color defined as "Home Depot™ Orange," but an ink corresponding to this spot color is not available on the printing mechanism, the raster image processor 116 looks up the definition for "Home Depot™ Orange" in the spot color table. The pre-defined combination of inks corresponding to "Home Depot™ Orange" stored in the spot color table is used to replace the ink or combination of inks that was determined for the spot color. In many scenarios, the spot color layer is only an intermediate layer, which is later either mapped to a specialty ink loaded on the printing mechanism or to a pre-defined combination of process colors stored in the spot color table.

The embodiments described herein use deep neural networks and convolutional neural networks for classification of objects in images. The classification can be used during creation of print data to improve print quality or create certain effects on the printout. The systems disclosed herein generate a mask layer to add spot colors or special inks (e.g., matte, varnish, fluorescent, or "glow in the dark" ink), or otherwise change the way colors are treated, either inside or outside the detected objects. Optionally, pre-flight module 108 automatically or semi-automatically loads the specialty inks and/or selects an appropriate printer capable of printing the specialty inks. The pre-flight module 108 can address multiple virtual queues, each of which have the capability to target the inks identified and queue jobs of like colors.

Figure 2:
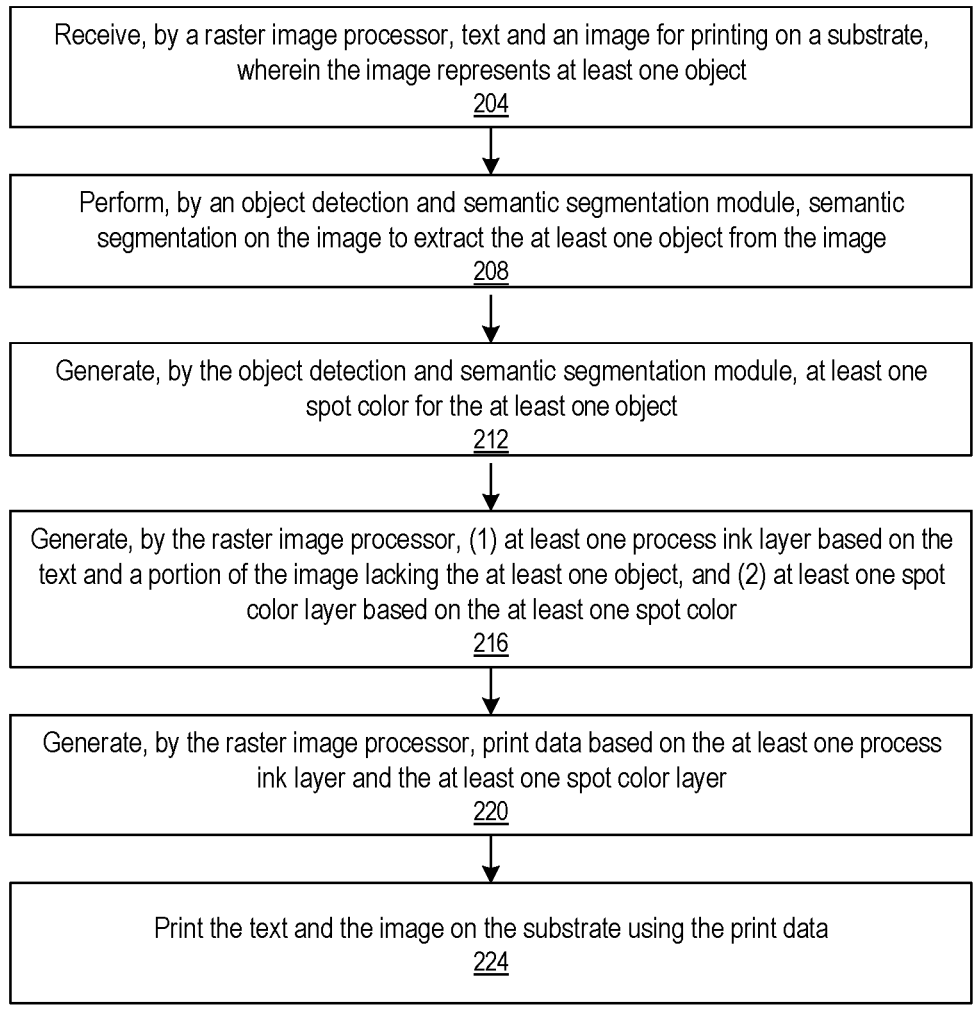
FIG. 2 is a flow diagram illustrating a process for object color management using raster image processors and object detection and semantic segmentation, in accordance with one or more embodiments.

FIG. 2 is a flow diagram illustrating a process 200 for object color management using raster image processors and object detection and semantic segmentation, in accordance with one or more embodiments. In some implementations, process 200 is performed by printing system 600 illustrated and described in more detail with reference to FIG. 6. In some implementations, process 200 is performed by a computer system, e.g., the example computer system 800 illustrated and described in more detail with reference to FIG. 8. Particular entities, for example, object detection and semantic segmentation system 500 (illustrated and described in more detail with reference to FIG. 5) perform some or all of the steps of process 200 in other implementations. Likewise, implementations can include different and/or additional steps or can perform the steps in different orders.

In act 204, a printing system that includes at least one computer processor uses a raster image processor to receive text and an image for printing on a substrate. The image represents or comprises at least one object. The raster image processor is the same as or similar to the raster image processor 116 illustrated and described in more detail with reference to FIG. 1. The image is the same as or similar to the image 104 illustrated and described in more detail with reference to FIG. 1. The object is the same as or similar to the object 136 illustrated and described in more detail with reference to FIG. 1. The text and image can be received over a bus, a network, a USB drive, or any other means of data communication described with reference to FIG. 8.

The raster image processor is the component used to manage the image color management in process 200. The raster image processor detects the text and the image and hands the image off to an object detection and semantic segmentation module for processing the image. For example, in process 200 the object detection and semantic segmentation module is a sub-function of the raster image processor or a function called by the raster image processor.

In act 208, the printing system performs, by the object detection and semantic segmentation module, semantic segmentation on the image to extract the at least one object from the image. The semantic segmentation and production of the at least one spot color can be a function called by the raster image processor. The object detection and semantic segmentation module is the same or similar to the object detection and semantic segmentation module 112 illustrated and described in more detail with reference to FIG. 1. Semantic segmentation is described in more detail with reference to FIG. 1.

In act 212, the printing system generates or produces, using the object detection and semantic segmentation module, at least one spot color for the at least one object. The printing system uses the object detection and semantic segmentation module to process the image to detect the object within, and determines at least one spot color that should be used for coloring the object when printing. Spot colors and spot color generation using object detection and semantic segmentation module 112 is described in more detail with reference to FIG. 1. The object detection and semantic segmentation module is trained to perform the semantic segmentation and production of the at least one spot color using multiple training images. Object detection and semantic segmentation training is illustrated and described in more detail with reference to FIG. 5.

In some embodiments, the at least one spot color is stored in computer storage accessible by the printing system and indexed by the at least one object. For example, a curated list of brands, logos, or sports teams and their associated spot colors are stored in a computer database or used in training images to train the object detection and semantic segmentation module. Once the object detection and semantic segmentation module segments and recognizes the object, it can use the object to quickly access the stored spot colors for the object from database files or a disk drive. The indexing optimizes the database querying speed by serving as an organized lookup table with pointers to the location of the requested colors.

In act 216, the printing system generates, using the raster image processor, (1) at least one process ink layer based on the text and a portion 140 of the image lacking the at least one object, and (2) at least one spot color layer based on the at least one spot color. The at least one process ink layer is the same as or similar to the at least one process ink layer 124 illustrated and described in more detail with reference to FIG. 1. The portion 140 is illustrated with reference to FIG. 1 and includes the text, other background objects, colors, etc. The at least one spot color layer is similar to or the same as the at least one spot color layer described in more detail with reference to FIG. 1. In some implementations, the spot color layer is the same as or similar to the mask layer 128 illustrated and described in more detail with reference to FIG. 1.

In act 220, the printing system generates, using the raster image processor, print data based on the at least one process ink layer and the at least one spot color layer. The print data is the same as or similar to print data 132 illustrated and described in more detail with reference to FIG. 1. In some embodiments, the portion 140 of the image lacking the at least one object is a first portion of the image. A second portion 144 of the image has the at least one object. The second portion 144 is illustrated with reference to FIG. 1. The printing system masks, by the raster image processor, the second portion 144 of the image based on the at least one spot color layer. In some embodiments, the second portion 144 of the image is printed using at least one of a suede ink, a reflective ink, a varnish, a white ink, a puff ink, a metallic ink, or a glow ink.

In act 224, a printing mechanism communicatively coupled to the at least one computer processor prints the text and the image on the substrate using the print data. The at least one process ink layer is associated with at least one process color. Process colors are described in more detail with reference to FIG. 1. The printing mechanism is configured to print the text and the image on the substrate using the at least one process color and the at least one spot color.

Figure 3:
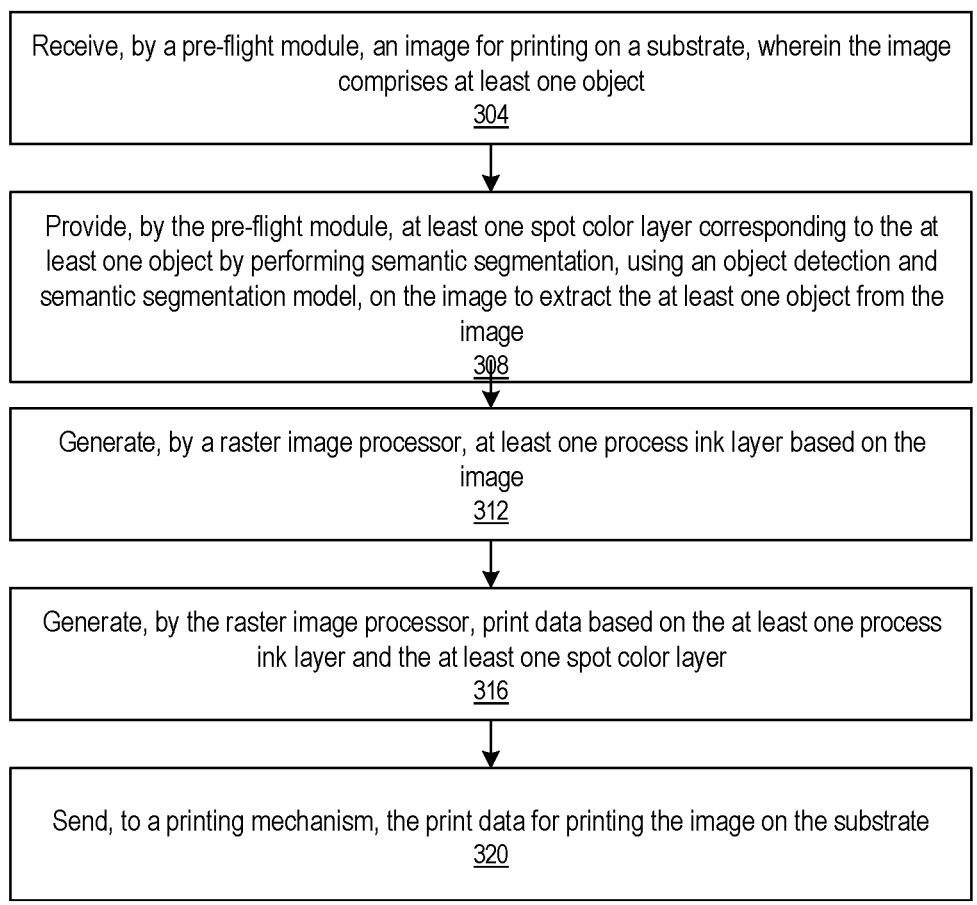
FIG. 3 is a flow diagram illustrating a process for object color management using raster image processors and object detection and semantic segmentation, in accordance with one or more embodiments.

FIG. 3 is a flow diagram illustrating a process for object color management using raster image processors and object detection and semantic segmentation, in accordance with one or more embodiments. In some implementations, process 300 is performed by printing system 600 illustrated and described in more detail with reference to FIG. 6. In some implementations, process 300 is performed by a computer system, e.g., the example computer system 800 illustrated and described in more detail with reference to FIG. 8. Particular entities, for example, object detection and semantic segmentation system 500 (illustrated and described in more detail with reference to FIG. 5) perform some or all of the steps of process 300 in other implementations. Likewise, implementations can include different and/or additional steps or can perform the steps in different orders.

In some embodiments, a non-transitory computer readable medium (e.g., memory 810 illustrated and described in more detail with reference to FIG. 8) stores computer instructions that are executed by one or more computer processors (e.g., processor 802 illustrated and described in more detail with reference to FIG. 8). In act 304, the computer instructions cause the one or more computer processors to receive, by a pre-flight module, an image for printing on a substrate. An example pre-flight module 108 is illustrated in more detail with reference to FIG. 1. The image is the same as or similar to the image 104 illustrated and described in more detail with reference to FIG. 1. The image comprises at least one object, which is the same as or similar to the object 136 illustrated and described in more detail with reference to FIG. 1.

The pre-flight module can be implemented in software such as in the computer instructions, hardware, firmware, or a combination thereof. The pre-flight module reduces the likelihood of rasterization problems, performs color corrections, provides that images and graphics embedded by the client have been provided and are available to a raster image processor, and provides that image files are of the correct color format. In particular, the pre-flight module provides that the correct color separations or ink plates are being output. An example raster image processor 116 is illustrated and described in more detail with reference to FIG. 1.

In act 308, in some implementations the pre-flight module is used to provide at least one spot color corresponding to the at least one object by performing semantic segmentation. In some embodiments, the pre-flight module produces at least one spot color layer that is fed into a raster image processor. Spot colors and semantic segmentation are described in more detail with reference to FIGS. 1-2. The semantic segmentation is performed using an object detection and semantic segmentation module on the image to extract the at least one object from the image. The object detection and semantic segmentation module can be embedded with the pre-flight module or external to the pre-flight module as shown by FIG. 1.

In some examples, the object detection and semantic segmentation process is a function called by the pre-flight module. The object detection and semantic segmentation module is the same as or similar to the object detection and semantic segmentation module 500 illustrated and described in more detail with reference to FIG. 5. The pre-flight module processes the image to detect the object within, and determines at least one spot color that should be used for coloring the object in the printed image. In some examples, the pre-flight module classifies the at least one object based on training images. The pre-flight module can perform contextual image classification using pattern recognition. For example, an approach is focusing on the relationship of the nearby pixels.

In some embodiments, the pre-flight module or another component is used to load at least one specialty ink corresponding to the at least one spot color provided by the pre-flight module as soon as the spot colors are determined. The at least one specialty ink is loaded into a printing system or printing mechanism. For example, a white ink, clear ink, or metallic ink channel is assigned to a spot color. The process inks are printed either behind or on top of the spot color. Pre-loading of at least one specialty ink can be used to simulate the final production run on a white or colored substrate. Special effects using gold or metallic inks can be created especially by multi-pass (multi-layer) printing.

In act 312, the raster image processor is used to generate at least one process ink layer based on the image. Process inks and process ink layers are described in more detail with reference to FIGS. 1-2. An example process ink layer 124 is illustrated and described in more detail with reference to FIG. 1. In some embodiments, the image input to the system is a digital image and the system produces an out digital image in which the at least one object has the at least one spot color provided by the object detection and semantic segmentation system. For example, the image received by the pre-flight module is a first image. The pre-flight module or another component generates a second image in which the at least one object is colored using the at least one spot color. Instead of being used for printing, the second image is stored, displayed on electronic displays, or sent to another computer system for display in a video or advertisement.

In act 316, in some implementations the raster image processor is used to generate print data based on the at least one process ink layer and the at least one spot color layer. Example print data 132 is illustrated and described in more detail with reference to FIG. 1. In some embodiments, the raster image processor is used to generate first print data based on the at least one process ink layer and second print data based on the at least one spot color. The first print data and second print data can be combined to provide a combined print data file to a printing system. In some examples, multiple color layers are stacked and blended into the combined print data file. In some examples, the raster image processor masks a portion of the first print data based on the at least one spot color. For example, layer masking is used to control the visibility of objects in each layer to provide a combined print data file to a printing system. An example mask layer 128 corresponding to the at least one object is illustrated and described in more detail with reference to FIG. 1.

In act 320, in some implementations the print data is sent to a printing mechanism for printing the image on the substrate. Example printing mechanisms, example printing processes, and example printing systems are illustrated and described in more detail with reference to FIGS. 6 and 7. In some examples, multiple print data files (e.g., the first print data and the second print data) are sent to a printing mechanism for printing the image on the substrate. In some embodiments, the pre-flight module is used to select the printing mechanism from a plurality of printing mechanisms. For example, different printing mechanisms have different capabilities. The pre-flight module selects an appropriate printing mechanism that is loaded with one or more specialty inks corresponding to the spot colors needed for a particular image. The selected printing mechanism is configured to print using at least one specialty ink corresponding to the at least one spot color. For example, some printing mechanisms can support up to eight colors, other printing mechanisms may have 4-8 print heads having different dots per inch (DPI) specifications. Printing mechanisms can have different printing resolutions, different numbers of passes configured for high-density applications, or different ink management.

Figure 4:
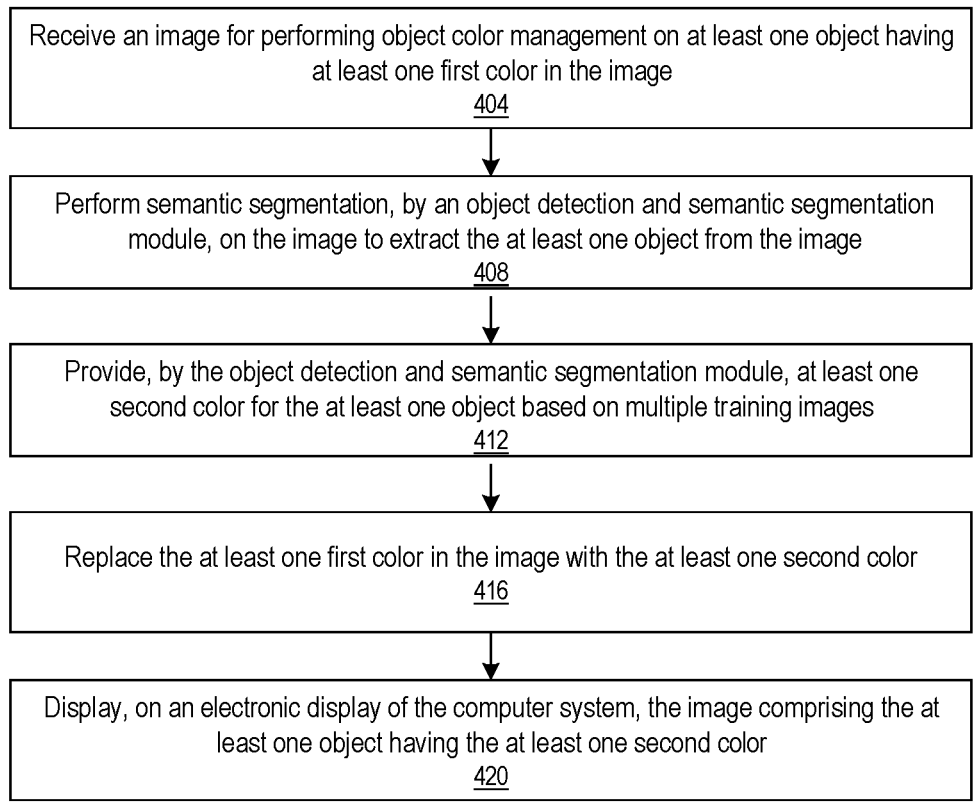
FIG. 4 is a flow diagram illustrating a process for object color management using raster image processors and object detection and semantic segmentation, in accordance with one or more embodiments.

FIG. 4 is a flow diagram illustrating a process for object color management using raster image processors and object detection and semantic segmentation, in accordance with one or more embodiments. In some implementations, process 400 is performed by printing system 600 illustrated and described in more detail with reference to FIG. 6. In some implementations, process 400 is performed by a computer system, e.g., the example computer system 800 illustrated and described in more detail with reference to FIG. 8. Particular entities, for example, object detection and semantic segmentation system 500 (illustrated and described in more detail with reference to FIG. 5) perform some or all of the steps of process 400 in other implementations. Likewise, implementations can include different and/or additional steps or can perform the steps in different orders.

In step 404, a computer system that includes at least one computer processor is used to perform process 400. The computer system includes a non-transitory, computer-readable storage medium storing a software filter. The software filter is a computer program or subroutine to process an input stream of images or video. The software filter produces an output stream. The software filter can be used individually or strung together with other components to form a pipeline. When executed by the at least one computer processor, the software filter causes the at least one computer processor to receive an image for performing object color management on an object having at least one first color in the image. For example, the image includes a sports jersey and the first colors are purple and gold. The image can be a logo or a video frame. The embodiments disclosed herein can thus be used to perform color management for a video stream.

The image is the same as or similar to the image 104 illustrated and described in more detail with reference to FIG. 1. The object is the same as or similar to the object 136 illustrated and described in more detail with reference to FIG. 1. The image can be received over a bus, a network, a USB drive, or any other means of data communication described with reference to FIG. 8. In some implementations, the software filter causes the at least one computer processor to receive an image for performing object color management on an object having at least one color in the image. For example, the image includes a sports jersey and the at least one color includes purple and gold.

In some implementations, the computer system is an extended-reality system. The received image can include video, computer-generated art or graphics, text, audio, etc., for use in an extended-reality application. In some implementations, the image is displayed on a wearable device.

In step 408, an object detection and semantic segmentation module is used to perform semantic segmentation on the image to extract at least one object from the image. The object detection and semantic segmentation module is the same or similar to the object detection and semantic segmentation module 112 illustrated and described in more detail with reference to FIG. 1. The object detection and semantic segmentation module converts the image into a collection of regions of pixels that are represented by a mask or a labeled image. By dividing an image into segments, the system can process only the important segments of the image instead of processing the entire image.

In some implementations, the object detection and semantic segmentation module is used to segment the image to extract the object from the image. Semantic segmentation (described in more detail with reference to FIG. 1) can be used to segment the image. In embodiments, the computer system performs object recognition on the image to detect and/or classify the object, e.g., using edge detection, gradient matching, or greyscale matching.

In step 412, the object detection and semantic segmentation module is used to provide at least one second color for the at least one object based on multiple training images. Providing a spot color to replace a color in an image is described in more detail with reference to FIG. 1. In some implementations, the object detection and semantic segmentation module is used to segment the object into at least a first part and a second part. For example, the object is a logo having stylized text and an icon. The object is segmented into the stylized text portion and the icon portion. In some examples, the object is a colored shirt having a different colored stripe across the shirt. The shirt is segment into a first part and a second part (the stripe). The first part and the second part can have different shapes, different colors, or different shades of a color.

In some implementations, the object detection and semantic segmentation module is used to provide a first part color for the first part and a second part color for the second part based on multiple training images. For example, the first part is a stylized text portion and the object detection and semantic segmentation module produces a particular shade of blue for the first part color. The second part can be an icon portion and the object detection and semantic segmentation module produces a particular shade of yellow for the second part color.

In step 416, the computer system replaces the at least first color in the image with the at least one second color. For example, the first colors are purple and gold. The second colors are blue and yellow. Color correction of the received image can thus be performed. To replace the colors, the computer system can use a global (or spatially uniform) operator or a local (or spatially varying) operator. For example, a non-linear function based on the at least first color, luminance, and other variables of the image can be used. In other examples, the parameters of the non-linear function change in each pixel, according to features extracted from the surrounding parameters. In some implementations, the computer system replaces the at least one color (e.g., purple and gold) of the object in the image with the first part color (e.g., a particular shade of blue) and the second part color (e.g., a particular shade of yellow).

In some embodiments, the software filter is used to color management of sports merchandise. For example, the software filter can address photos of a sports game on social media to make the sports team colors consistent with brand colors. In some examples, the software filter can address media created by a social media influencer to adjust the colors of items they are promoting in images to keep the brand colors consistent. In some examples, the software filter changes colors of items, as needed, without needing to manually photoshop the images or take another photo. The AI embodiments disclosed herein detects colors of objects having higher sales and automatically adjust the colors of images for production or advertising.

In some implementations, the software filter causes the at least one computer processor to receive, from a user dashboard, information describing a user color. For example, the user dashboard is a type of graphical user interface that provides at-a-glance views of key performance indicators and user input interfaces for a designer or other businessperson to provide user colors (e.g., for colors or brands) to the computer system. The user dashboard is accessible by a web browser and can be linked to regularly updating data sources. The computer system replaces the first part color (e.g., a particular shade of blue) of the first part in the image with the user color (e.g., another shade of blue for displaying the image on the electronic display of the computer system. In some embodiments, the user dashboard/interface enables a user to design or pick a color and have it applied to an object each time it is in images. A user can pick an area, and wherever a certain color is seen in the area, replace it with another specific color. In some examples, a user picks a color that they want to plug in.

In step 416, the computer system displays the image comprising the at least one object having the at least one second color (e.g., blue and yellow) on an electronic display (e.g., video display 818 illustrated and described in more detail with reference to FIG. 9). In some implementations, the image comprising the object having the first part color (e.g., a particular shade of blue) and the second part color (e.g., a particular shade of yellow) is displayed on an electronic display of the computer system.

Figure 5:
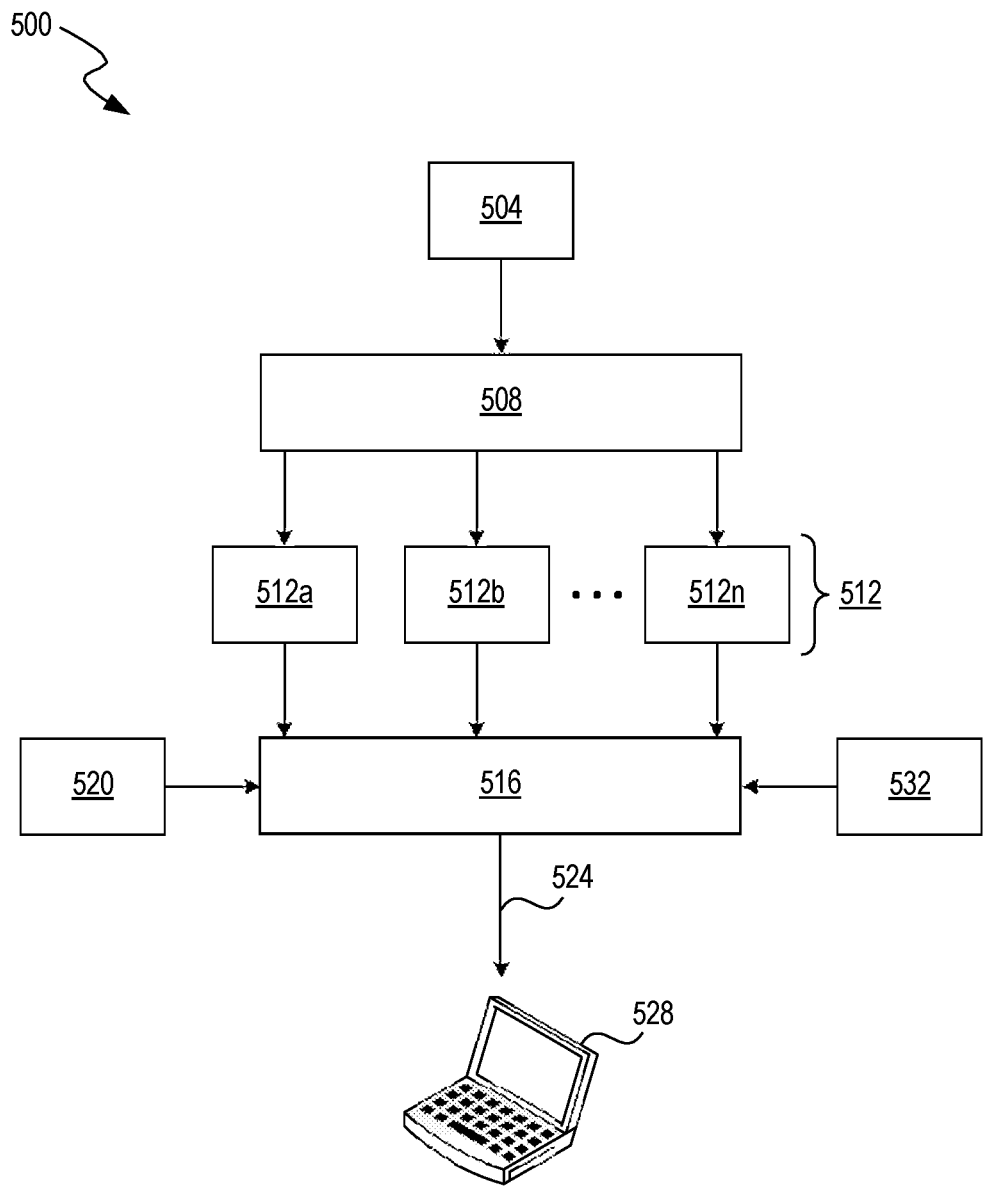
FIG. 5 is a block diagram illustrating an example object detection and semantic segmentation system, in accordance with one or more embodiments.

FIG. 5 is a block diagram illustrating an example object detection and semantic segmentation system 500. The object detection and semantic segmentation system 500 is implemented using components of the example computer system 800 illustrated and described in more detail with reference to FIG. 8. For example, the object detection and semantic segmentation system 500 is implemented on the computer system 800 using instructions 808 programmed in the main memory 806 illustrated and described in more detail with reference to FIG. 8. Likewise, embodiments of the object detection and semantic segmentation system 500 includes different and/or additional components or be connected in different ways. The object detection and semantic segmentation system 500 is sometimes referred to as an object detection and semantic segmentation module.

The object detection and semantic segmentation system 500, in some embodiments, includes a feature extraction module 508 implemented using components of the example computer system 800 illustrated and described in more detail with reference to FIG. 8. In some embodiments, the feature extraction module 508 extracts a feature vector 512 from input data 504. In some examples, input data 504 includes properties of ink to be deposited on a substrate, image data, or objects extracted from an image by a raster image processor. Input data 504 can include a feature vector of different colors of ink in corresponding segments of an image pattern. Feature vector 512 includes features 512a, 512b, . . . , 512n. The feature extraction module 508 reduces the redundancy in the input data 504, e.g., repetitive data values, to transform the input data 504 into the reduced set of features in feature vector 512, e.g., features 512a, 512b, . . . , 512n. The feature vector 512 contains the relevant information from the input data 504, such that, in some examples, events or data value thresholds of interest are identified by the object detection and semantic segmentation model 516 by using this reduced representation. In some example embodiments, the following dimensionality reduction techniques are used by the feature extraction module 508: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In some embodiments, the object detection and semantic segmentation model 516 performs deep learning (also known as deep structured learning or hierarchical learning) directly on the input data 504 to learn data representations, as opposed to using task-specific algorithms. In deep learning, no explicit feature extraction is performed; the features of feature vector 512 are implicitly extracted by the object detection and semantic segmentation system 500. In one example, the object detection and semantic segmentation model 516 uses a cascade of multiple layers of nonlinear processing units for implicit feature extraction and transformation. Each successive layer uses the output from the previous layer as input. In some examples, the object detection and semantic segmentation model 516 thus learns in supervised (e.g., classification) and/or unsupervised (e.g., pattern analysis) modes. In some examples, the object detection and semantic segmentation model 516 learns multiple levels of representations that correspond to different levels of abstraction, wherein the different levels form a hierarchy of concepts. In this manner, the object detection and semantic segmentation model 516 is configured to differentiate features of interest from background features.

In one example, the object detection and semantic segmentation model 516, e.g., in the form of a convolutional neural network generates the output 524, without the need for feature extraction, directly from the input data 504. In some examples, the output 524 is provided to the computer device 528 or video display 818. The computer device 528 is a server, computer, tablet, smartphone, smart speaker, etc., implemented using components of the example computer system 800 illustrated and described in more detail with reference to FIG. 8. In some embodiments, the steps performed by the object detection and semantic segmentation system 500 are stored in memory on the computer device 528 for execution.

A convolutional neural network is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. In some examples, the response of an individual neuron to stimuli within its receptive field is approximated mathematically by a convolution operation. convolutional neural networks are based on biological processes and are variations of multilayer perceptrons designed to use minimal amounts of preprocessing.

In some examples, the object detection and semantic segmentation model 516 is a convolutional neural network that includes both convolutional layers and max pooling layers. In some examples, the architecture of the object detection and semantic segmentation model 516 is "fully convolutional," which means that variable sized sensor data vectors can be fed into it. In some examples, for all convolutional layers, the object detection and semantic segmentation model 516 specifies a kernel size, a stride of the convolution, and an amount of zero padding applied to the input of that layer. In some examples, for the pooling layers, the object detection and semantic segmentation model 516 specifies the kernel size and stride of the pooling.

In some embodiments, the object detection and semantic segmentation system 500 trains the object detection and semantic segmentation model 516, based on the training data 520, to correlate the feature vector 512 to expected outputs in the training data 520. In some examples, training data 520 includes properties of ink to be deposited on a substrate, print data image data, or data describing layers. As part of the training of the object detection and semantic segmentation model 516, the object detection and semantic segmentation system 500 forms a training set of features and training labels by identifying a positive training set of features that have been determined to have a desired property in question, and, in some embodiments, forms a negative training set of features that lack the property in question.

The object detection and semantic segmentation system 500 applies object detection and semantic segmentation techniques to train the object detection and semantic segmentation model 516, that when applied to the feature vector 512, outputs indications of whether the feature vector 512 has an associated desired property or properties, such as a probability that the feature vector 512 has a particular Boolean property, or an estimated value of a scalar property. In some examples, the object detection and semantic segmentation system 500 further applies dimensionality reduction (e.g., via linear discriminant analysis (LDA), PCA, or the like) to reduce the amount of data in the feature vector 512 to a smaller, more representative set of data.

In some examples, the object detection and semantic segmentation system 500 uses supervised object detection and semantic segmentation to train the object detection and semantic segmentation model 516, with feature vectors of the positive training set and the negative training set serving as the inputs. In some embodiments, different object detection and semantic segmentation techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, convolutional neural networks, etc., are used. In some example embodiments, a validation set 532 is formed of additional features, other than those in the training data 520, which have already been determined to have or to lack the property in question. The object detection and semantic segmentation system 500 applies the trained object detection and semantic segmentation model 516 to the features of the validation set 532 to quantify the accuracy of the object detection and semantic segmentation model 516. Common metrics applied in accuracy measurement include precision and recall, where precision refers to a number of results the object detection and semantic segmentation model 516 correctly predicted out of the total it predicted, and recall is a number of results the object detection and semantic segmentation model 516 correctly predicted out of the total number of features that had the desired property in question.

In some embodiments, the object detection and semantic segmentation system 500 iteratively re-trains the object detection and semantic segmentation model 516 until the occurrence of a stopping condition, such as the accuracy measurement indication that the object detection and semantic segmentation model 516 is sufficiently accurate, or a number of training rounds having taken place. In some examples, the validation set 532 includes data corresponding to images, embedded objects, spot colors, or specialty inks, or combinations thereof. This allows the detected values to be validated using the validation set 532. In some examples, the validation set 532 is generated based on analysis to be performed.

In some embodiments, object detection and semantic segmentation system 500 is a generative artificial intelligence or generative AI system capable of generating text, images, or other media in response to prompts. Generative AI systems use generative models such as large language models to produce data based on the training data set that was used to create them. A generative AI system is constructed by applying unsupervised or self-supervised object detection and semantic segmentation to a data set. The capabilities of a generative AI system depend on the modality or type of the data set used. For example, generative AI systems trained on words or word tokens are capable of natural language processing, machine translation, and natural language generation and can be used as foundation models for other tasks. In addition to natural language text, large language models can be trained on programming language text, allowing them to generate source code for new computer programs. Generative AI systems trained on sets of images with text captions are used for text-to-image generation and neural style transfer.

Although some embodiments are described herein with respect to object detection and semantic segmentation models, other prediction models (e.g., a statistical model) may be used instead of or in addition to object detection and semantic segmentation models. For example, a statistical model may be used to replace a neural network model in one or more embodiments.

Figure 6:
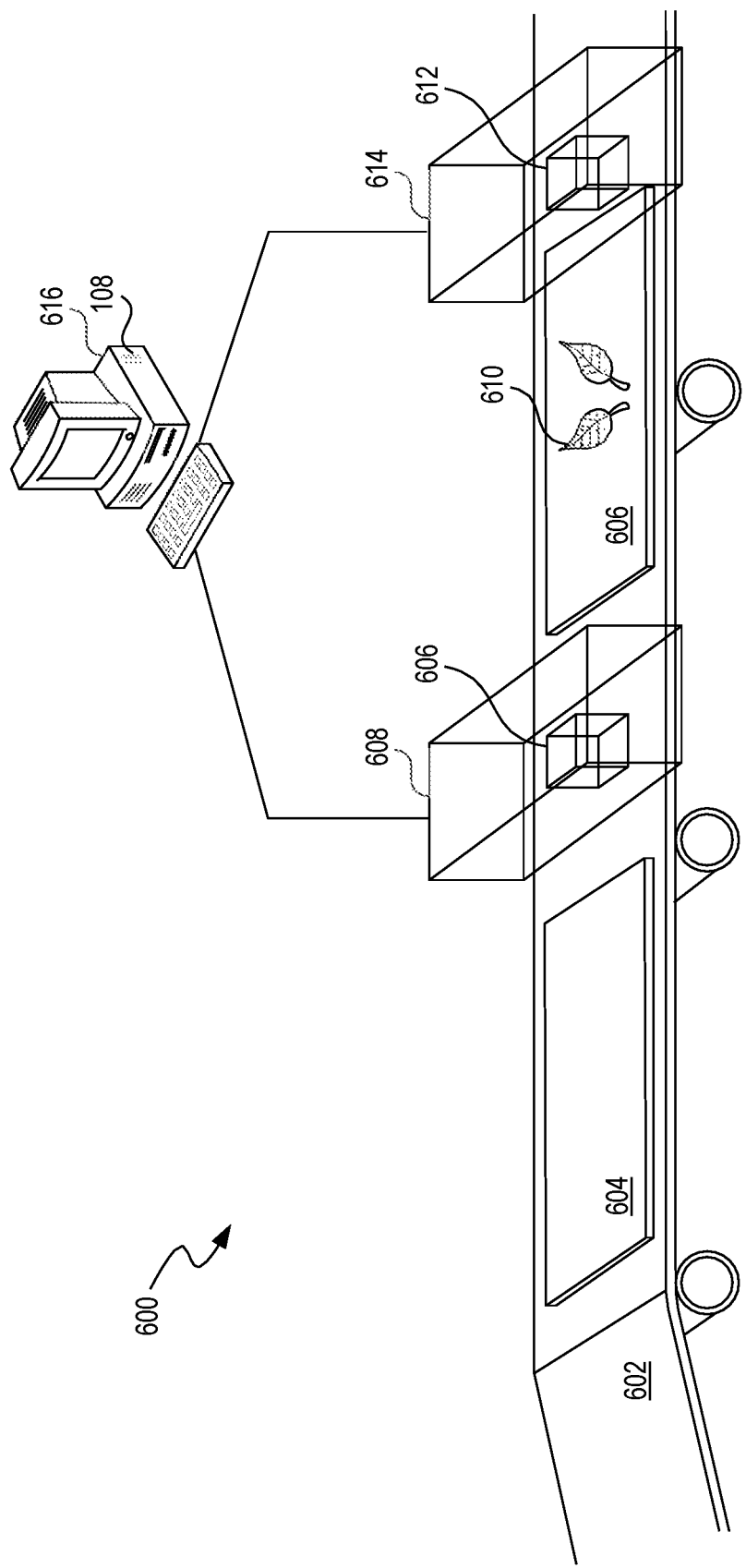
FIG. 6 is a block diagram illustrating a perspective view of a printing system, in accordance with one or more embodiments.

FIG. 6 is a block diagram illustrating a perspective view of a printing system 600, in accordance with one or more embodiments. The printing system 600 includes a mechanism including a printer head 606, at least one light source 612, and a transfer belt 602. Embodiments may include various combinations of these and other components, e.g., a dryer. For example, the light source 612 is present in some embodiments, but not in others. As another example, a dryer is included if an image 610 will not be quickly transferred to a substrate. In some examples, while the printing system 600 of FIG. 6 includes a transfer belt 602, other means for conveying and/or retaining a transfer material 604 are used, such as a rotating platform or stationary bed.

The printer head 606 is configured to deposit ink onto a transfer material 604 in the form of an image 610. The transfer material 604, which also referred to herein as a former material, is flexible, which allows the image 610 to be transferred to complex-shaped substrates. In one example, the transfer material 604 is a rubber former, a thermoformable material, etc. In some embodiments, the printer head 606 is an inkjet printer head that jets ink onto the transfer material 604 using, for example, piezoelectric nozzles. Thermal printer heads are generally avoided in an effort to avoid premature sublimation of the ink. In some embodiments, the ink is a solid energy, e.g., UV curable ink. However, other inks are also used, such as water-based energy curable inks or solvent-based energy curable inks. According to different embodiments, ink is deposited in different forms, such as ink droplets and colored polyester ribbons.

In some embodiments, one or more light sources 612 cure some or all of the ink deposited onto the transfer material 604 by emitting UV radiation. In some examples, the light source(s) 612 is any combination of UV fluorescent bulbs, UV light emitting diodes (LEDs), low-pressure, e.g., mercury (Hg), bulbs, or excited dimer (excimer) lamps and/or lasers. Various combinations of these light sources could be used. In some examples, a printing system 600 includes a low-pressure Hg lamp and a UV LED. As discussed in more detail with reference to FIG. 7, in some examples, the light source 612 is configured to emit UV radiation of a particular subtype.

The printer head 606 and light source 612 are illustrated as being directly adjacent to one another, i.e., neighboring without any intervening components. However, in other embodiments, additional components that assist in printing, curing, etc., are also present. In some examples, multiple distinct light sources 612 is positioned behind the printer head 606. FIG. 6 illustrates one possible order in which components are arranged in order to print an image 610 onto the transfer material 604. Other embodiments are considered in which additional components are placed before, between, or after the illustrated components, etc.

In some embodiments, one or more of the aforementioned components of the mechanism are housed within one or more carriages. For example, the printer head 606 is housed within a printing carriage 608, the light source 612 is housed within a curing carriage 614, etc. In addition to protecting the components from damage, the carriages, in some examples, also serve other benefits. For example, the curing carriage 614 limits what part(s) of the transfer material 604 and image 610 are exposed during the curing process. In some examples, the printing system 600 includes pulleys, motors, rails, and/or any combination of mechanical or electrical technologies that enable the carriages to travel along the transfer belt 602, i.e., with respect to the transfer material 604. In alternative embodiments, the carriages are fixedly attached to a rail or base of the printing system 600. In these embodiments, the transfer material 604 is moved in relation to the printer head 606, light source 612, etc., such that ink is deposited onto the transfer material 604.

In various embodiments, some or all of the components of the printing system and/or the mechanism are controlled by a computer system 616. The computer system 616 is the same as or similar to the computer system 500 illustrated and described in more detail with reference to FIG. 5. In some examples, the computer system 616 allows a user to input printing instructions and information, modify print settings, e.g., by changing cure settings, alter the printing process, etc.

Figure 7:
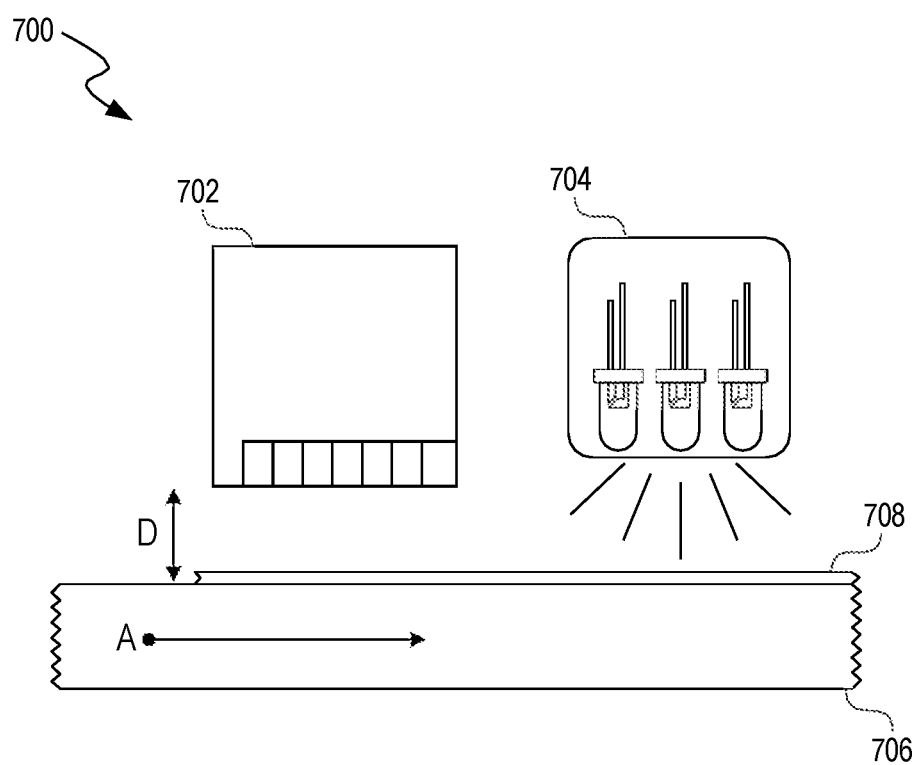
FIG. 7 is a block diagram illustrating a side view of a printing system, including a printer head and a light source, in accordance with one or more embodiments.

FIG. 7 is a block diagram illustrating a side view of a printing system 700, including a printer head 702 and a light source 704, in accordance with one or more embodiments. While a single-pass mechanism is illustrated by FIG. 7, other embodiments employ multi-pass, i.e., scan, configurations. Similarly, embodiments can be modified for various printers, e.g., flatbed printer, drum printer, or lane printer. For example, a flatbed printer includes a stable bed and a traversing printer head, a stable printer head and a traversing bed, etc.

In some examples, the printer head 702 includes distinct ink/color drums, e.g., cyan, magenta, yellow, and key (CMYK), or colored polyester ribbons that are deposited onto the surface of a transfer material 706. Path A represents the media feed direction, e.g., the direction in which the transfer material 706 travels during the printing process. Path D represents the distance between the printer head 702 and the surface of the transfer material 706.

As described above, both direct and indirect printing have conventionally been carried out only on flat surfaces. The printing systems and methods described herein, however, allow images to be printed on complex-shaped, i.e., non-planar, surfaces by depositing ink directly onto a transfer material 706 and then transferring the ink to a substrate. When printing directly onto a surface, print quality relies on accuracy of ink drop placement. Therefore, maintaining a constant or nearly constant distance between the printer head 702 and the flat surface of the transfer material 706 is necessary. Airflow, velocity variability, etc., can affect drop placement even when the change in distance is small, e.g., a few millimeters.

In some embodiments, a light source 704 cures some or all of the ink 708 deposited onto the transfer material 706 by the printer head 702. In some examples, the light source 704 is configured to emit wavelengths of UV electromagnetic radiation of subtype V (UVV), subtype A (UVA), subtype B (UVB), subtype C (UVC), or any combination thereof. Generally, UVV wavelengths are those wavelengths measured between 395 nanometers (nm) and 445 nm, UVA wavelengths measure between 315 nm and 395 nm, UVB wavelengths measure between 280 nm and 315 nm, and UVC wavelengths measure between 100 nm and 280 nm. However, one skilled in the art will recognize these ranges are somewhat adjustable. For example, some embodiments characterize wavelengths of 285 nm as UVC.

In some examples, the light source 704 is, for example, a fluorescent bulb, a light emitting diode (LED), a low-pressure, e.g., mercury (Hg), bulb, or an excited dimer (excimer) lamp/laser. Combinations of different light sources could be used in some embodiments. Generally, the light source 704 is selected to ensure that the curing temperature does not exceed the temperature at which the ink 708 begins to sublime. For example, light source 704 of FIG. 7 is a UV LED lamp that generates low heat output and is used for a wider range of former types. UV LED lamps are associated with lower power consumption, longer lifetimes, and more predictable power output. When a printing system includes a UV LED lamp, the use of the printing system causes a reduction in an amount of power consumption of the printing system. For example, when the printing mechanisms and printer systems disclosed herein are implemented using light source 704 (UV LED lamp), the printer operation results in reduced power consumption.

Alternatively, or additionally, other curing processes are also used, such as epoxy (resin) chemistries, flash curing, and electron beam technology. One skilled in the art will appreciate that many different curing processes could be adopted that utilize specific timeframes, intensities, rates, etc. In some embodiments, the intensity increases or decreases linearly or non-linearly, e.g., exponentially, logarithmically. In some embodiments, the intensity is altered using a variable resistor or alternatively by applying a pulse-width-modulated (PWM) signal to the diodes in the case of an LED light source. In some examples, the light is modulated using amplitude modulation, polarization modulation, frequency modulation (e.g., as in wavelength-division multiplexing (WDM)), phase modulation (e.g., angle phase control), temporal modulation, and/or the like.

Embodiments of the invention include an extended-reality (XR) system. Extended reality is a catch-all term to refer to augmented reality, virtual reality, and mixed reality. The technology is intended to combine or mirror the physical world with a "digital twin world" that is able to interact with each other. An XR system can be used to perform color management as described in more detail with reference to FIGS. 1-4 and view the results.

Figure 8:
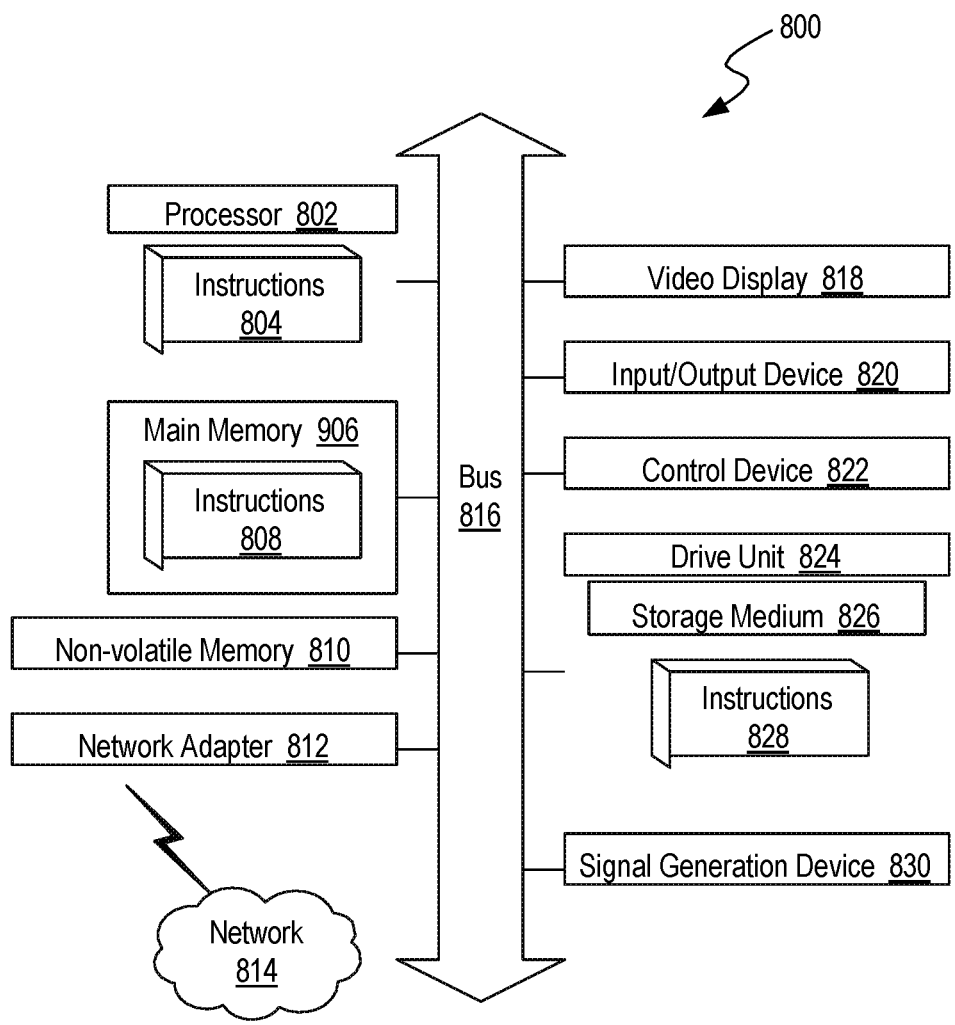
FIG. 8 is a block diagram illustrating an example computer system, in accordance with one or more embodiments.

FIG. 8 is a block diagram illustrating an example computer system 800, in accordance with one or more embodiments. In some examples, components of the example computer system 800 are used to implement the systems illustrated and described in more detail with reference to FIGS. 5-7. According to some embodiments, at least some operations described with reference to FIG. 1-3 are implemented on the computer system 800.

In some examples, the computer system 800 includes one or more central processing units ("processors") 802, main memory 806, non-volatile memory 810, network adapter 812 (e.g., network interface), video display 818, input/output devices 820, control device 822 (e.g., keyboard and pointing devices), drive unit 824 including a storage medium 826, and a signal generation device 930 that are communicatively connected to a bus 816. The bus 816 is illustrated as an abstraction that represents one or more physical buses and/or point-to-point connections that are connected by appropriate bridges, adapters, or controllers. In some examples, the bus 816, therefore, includes a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire").

In some examples, the computer system 800 shares a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality system (e.g., a head-mounted display), or another electronic device capable of executing a set of instructions (sequential or otherwise) that specify action(s) to be taken by the computer system 800.

While the main memory 806, non-volatile memory 810, and storage medium 826 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 828. The term "machine-readable medium" and "storage medium" shall also be taken to include any medium that is capable of storing, encoding, or carrying a set of instructions for execution by the computer system 1000.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 804, 808, 828) set at various times in various memory and storage devices in a computing device. When read and executed by the one or more processors 802, the instruction(s) cause the computer system 800 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 810, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 812 enables the computer system 800 to mediate data in a network 814 with an entity that is external to the computer system 800 through any communication protocol supported by the computer system 800 and the external entity. In some examples, the network adapter 812 includes a network adapter card, a wireless network interface card, a router, an access point, a wireless router, a switch, a multilayer switch, a protocol converter, a gateway, a bridge, a bridge router, a hub, a digital media receiver, and/or a repeater.

In some embodiments, the network adapter 812 includes a firewall that governs and/or manages permission to access/ proxy data in a computer network and tracks varying levels of trust between different machines and/or applications. In some examples, the firewall is any number of modules having any combination of hardware and/or software components able to enforce a predetermined set of access rights between a particular set of machines and applications, machines and machines, and/or applications and applications (e.g., to regulate the flow of traffic and resource sharing between these entities). In some embodiments, the firewall additionally manages and/or has access to an access control list that details permissions including the access and operation rights of an object by an individual, a machine, and/or an application, and the circumstances under which the permission rights stand.

According to some embodiments, the techniques introduced here are implemented by programmable circuitry (e.g., one or more microprocessors), software and/or firmware, special-purpose hardwired (i.e., non-programmable) circuitry, or a combination of such forms. In some examples, special-purpose circuitry is in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, but no special significance is to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications may be implemented by those skilled in the art.

What is claimed is:

1. A computer-implemented method for object color management by a raster image processor and an object detection and semantic segmentation module, the method comprising:
   receiving, by a computer system, an image for depositing ink onto a substrate to print the image on the substrate, wherein the image comprises at least one object;
   performing semantic segmentation, by the object detection and semantic segmentation module, on the image to extract the at least one object from the image,
      wherein the object detection and semantic segmentation module is trained to perform the semantic segmentation using multiple training images;
   generating, by the object detection and semantic segmentation module, (1) at least one mask layer corresponding to the at least one object and (2) at least one spot color for the at least one object based on the multiple training images;
   generating, by the raster image processor, (3) at least one process ink layer based on the image and (4) at least one spot color layer based on the at least one mask layer and the at least one spot color,
      wherein the at least one process ink layer is associated with at least one color of the ink;
   generating, by the raster image processor, print data based on the at least one process ink layer and the at least one spot color layer; and
   sending, to a printing system, the print data for printing the image on the substrate.

2. The method of claim 1, wherein the at least one color of the ink comprises at least one of cyan, yellow, magenta, black, orange, or green.

3. The method of claim 1, wherein the object detection and semantic segmentation module comprises a deep neural network or a convolutional neural network.

4. The method of claim 1, wherein the at least one spot color is associated with a suede ink, a reflective ink, a varnish, a white ink, a puff ink, a metallic ink, or a glow ink.

5. The method of claim 1, comprising masking, by the raster image processor, a portion of the image based on the mask layer prior to generating the print data,
   wherein the portion of the image is associated with the at least one object.

6. The method of claim 1, comprising:
   retrieving a defined combination of process ink colors corresponding to the at least one spot color from a spot color table,
   wherein the image is printed on the substrate using the combination of process ink colors.

7. The method of claim 1, wherein the at least one spot color is associated with a brand.

8. The method of claim 1, comprising:
   using an extended-reality (XR) system to perform color management.

9. A printing system, comprising:
   at least one computer processor configured to execute instructions to cause the printing system to:
      receive, by a raster image processor, text and an image for printing on a substrate,
         wherein the image comprises at least one object;
      perform, by an object detection and semantic segmentation module, semantic segmentation on the image to extract the at least one object from the image;
      produce, by the object detection and semantic segmentation module, at least one spot color for the at least one object;
      generate, by the raster image processor, (1) at least one process ink layer based on the text and a portion of the image lacking the at least one object, and (2) at least one specialty ink layer based on the at least one spot color;

generate, by the raster image processor, print data based on the at least one process ink layer and the at least one specialty ink layer; and a printing mechanism communicatively coupled to the at least one computer processor and configured to:

print the text and the image on the substrate using the print data.

10. The printing system of claim 9, wherein the at least one process ink layer is associated with at least one process color, and wherein the printing mechanism is configured to:

print the text and the image on the substrate using the at least one process color and the at least one spot color.

11. The printing system of claim 9, wherein the at least one spot color is stored in computer storage accessible by the printing system and indexed by the at least one object.

12. The printing system of claim 9, wherein the semantic segmentation and production of the at least one spot color is a function called by the raster image processor.

13. The printing system of claim 9, wherein the object detection and semantic segmentation module is trained to perform the semantic segmentation and production of the at least one spot color using multiple training images.

14. The printing system of claim 9, wherein the portion of the image lacking the at least one object is a first portion of the image, wherein a second portion of the image has the at least one object, and wherein the instructions cause the printing system to:

mask, by the raster image processor, the second portion of the image based on the at least one specialty ink layer.

15. The printing system of claim 14, wherein the second portion of the image is printed using at least one of a suede ink, a reflective ink, a varnish, a puff ink, a metallic ink, or a glow ink.

16. The printing system of claim 9, further comprising:

an extended-reality (XR) system for performing color management.

17. A non-transitory computer readable medium storing computer instructions that when executed by one or more computer processors, cause the one or more computer processors to:

receive, by a pre-flight module, an image for printing on a substrate, wherein the image comprises at least one object;

provide, by the pre-flight module, at least one spot color corresponding to the at least one object by performing semantic segmentation, using an object detection and semantic segmentation module, on the image to extract the at least one object from the image;

generate, by a raster image processor, at least one process ink layer based on the image;

generate, by the raster image processor, first print data based on the at least one process ink layer and second print data based on the at least one spot color; and send, to a printing mechanism, the first print data and the second print data for printing the image on the substrate.

18. The non-transitory computer readable medium of claim 17, wherein the instructions cause the one or more processors to:

load at least one specialty ink corresponding to the at least one spot color provided by the pre-flight module.

19. The non-transitory computer readable medium of claim 17, wherein the instructions cause the one or more processors to:

select, by the pre-flight module, the printing mechanism from a plurality of printing mechanisms, wherein the printing mechanism is configured to print using at least one specialty ink corresponding to the at least one spot color.

20. The non-transitory computer readable medium of claim 17, wherein the instructions cause the one or more processors to:

classify, by the pre-flight module, the at least one object based on training images.

* * * * *